METHOD OF MAKING GLASS CAPSULES FOR ELECTRICAL COMPONENTS

Filed May 31, 1963

INVENTOR.
Kurt Coper
BY
Donald P. Gillette
ATTORNEY

United States Patent Office 3,279,038

Patented Oct. 18, 1966

3,279,038

METHOD OF MAKING GLASS CAPSULES FOR ELECTRICAL COMPONENTS

Kurt Coper, Brookhaven, Pa., assignor to Consolidated Electronics Industries Corp., New York, N.Y., a corporation of Delaware Filed May 31, 1963, Ser. No. 284,449
4 Claims. (Cl. 29—155.5)

Figure 1:
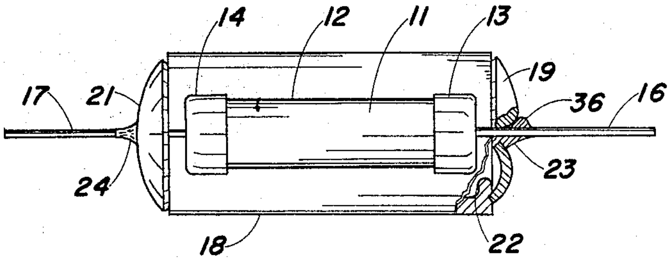

This invention relates to a process of encapsulating electrical components within a capsule consisting of a hollow glass body and a metal member sealed thereto for each conductive lead of the component.

In accordance with the invention, the component to be encapsulated is inserted into a length of glass tubing which is usually slightly longer than the component body plus any end caps that the component may have. An apertured disc of metal suitable for sealing to the glass is threaded onto one of the leads at one end of the component body, and the component, the surrounding glass tube, and the metal disc are placed within the field of a coil of an induction heater. Sufficient high frequency energy is supplied to the coil to heat the metal cap and to cause the adjacent glass to reach its melting point and to seal to the cap. Pressure is placed on the glass tubing and the disc to cause the periphery of the disc to form a hermetic seal with the glass. At the same time, a ring of suitable brazing material previously threaded onto the same lead and held adjacent to the disc melts and hermetically seals the joint between the lead and the aperture of the disc. During this process a suitable gas is directed into the region being heated so as to drive oxygen away from the lead and the aperture of the disc in order to permit a clean braze seal. At the same time sufficient air is permitted to reach the periphery of the disc to provide the necessary oxide coating required for proper sealing of the glass to the metal.

After the first end is sealed, a similar disc and a similar ring of brazing material are threaded onto the other lead of the component and that end of the resistor is heated by the induction heater to seal the periphery of the second disc to the glass and to seal the resistor lead into the aperture of the second disc, thus completing the capsule.

Figure 2:
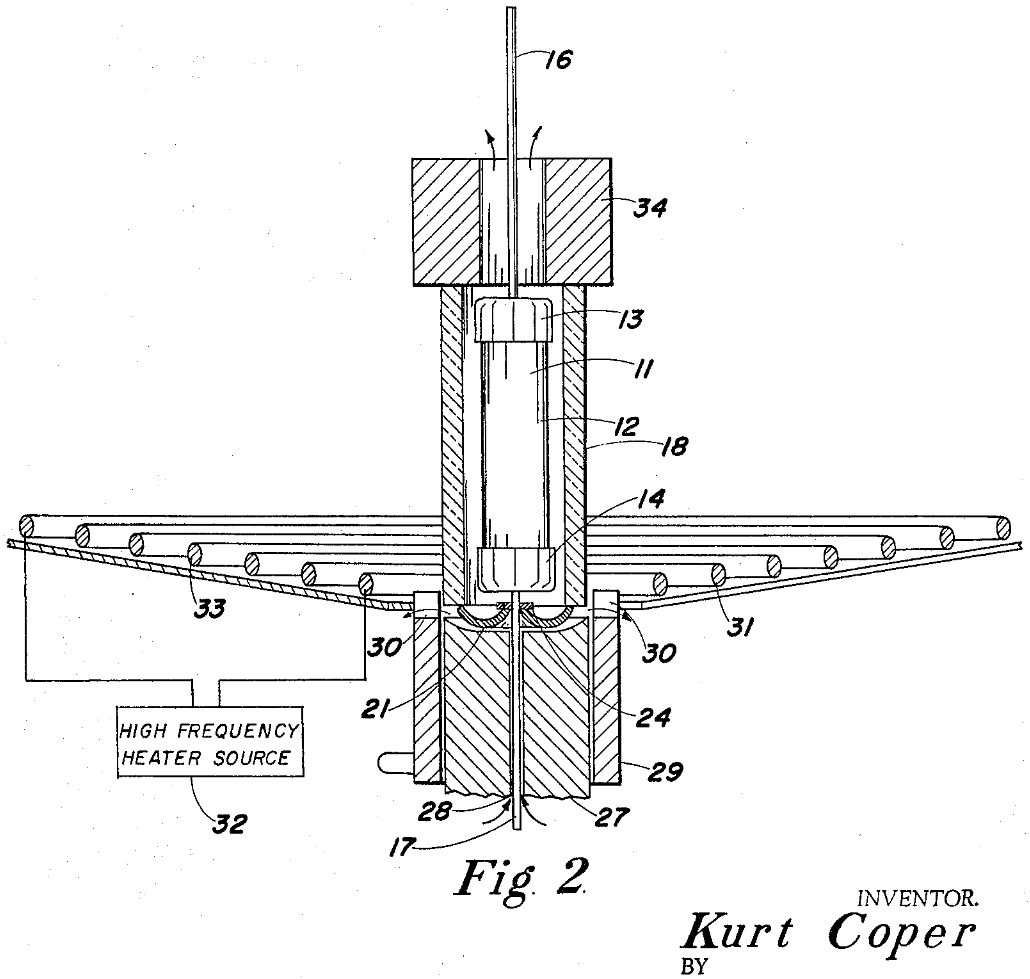

This invention will be described in greater detail in connection with the drawing in which:

FIG. 1 shows an encapsulated resistor made according to the invention, with parts broken away to show the cross-section thereof; and FIG. 2 is a cross-sectional view of a fixture for heating the end discs and the contiguous glass to form the capsule of FIG. 1.

While various types of electrical components, such a condensers, inductors, and various types of resistors, may be encapsulated in accordance with the teachings of the invention, the invention will be described in detail in connection with encapsulation of a resistive film resistor.

FIG. 1 shows a resistor that has been encapsulated according to the process of the invention. The resistor includes a helical, thin, resistive film 11 on an insulating body 12, preferably of ceramic material, having a relatively low coefficient of thermal expansion of the order of $5 \times 10^{-6}$ units per unit length per degree centigrade. Contact is made to each end of the helical resistive film by a pair of metal end caps 13 and 14, which grip the film 11 tightly enough to make a good contact therewith. A pair of gold-plated nickel or Dumet wire end leads 16 and 17 are attached to and extend substantially coaxially from the end caps 13 and 14. This plated wire has the advantage over the customary copper leads of not being dissolved by the molten silver during the brazing process. Also the nickel or Dumet wire has somewhat higher loss and therefore generates heat during the sealing process better than copper wire would.

The capsule comprises a cylindrical glass portion 18 which is preferably slightly longer than the total length of the insulator 12 together with the end caps 13 and 14. Each end of the glass tube 18 is closed by a disc of metal that is sealed to the glass, and for this purpose, I have used discs 19 and 21 of Kovar or a similar metal and hard, borosilicate #7052 glass tubing 18 having a coefficient of thermal expansion that substantially matches that of the Kovar discs.

A portion of the right hand end of the glass 18 has been broken away to show the configuration of the glass-to-metal seal. As may be seen, the edge of the disc 19, which is generally convex but with a concave central portion around the central aperture, extends slightly into the glass and, as a result, a small amount of glass is pushed inwardly as indicated by reference character 22.

The disc 19 is brazed to the lead 16 by a suitable material 23 such as coin silver which consists of about 90% silver and about 10% copper and has a melting point of about 980° C., high enough not to be evaporated or destroyed by the heat required to achieve the glass-to-metal seal by the disc 19 and the glass tube 18. A second seal 24 joins the disc 21 to the lead 17 at the other end of the capsule.

FIG. 2 shows one step of the sealing process for making the capsule shown in FIG. 1. In FIG. 2 the lead 17 is shown threaded through a ring 24 of coin silver having a thickness of approximately .010 inch and through the central aperture of the disc 21, which rests on the upper surface of a central portion 27 of a jig. The jig is provided with a central passageway 28 somewhat larger than the wire lead 17 so that the latter can fit loosely therein, and surrounding this central portion is an axially movable portion 29 that can be lifted a little distance so as to center the glass tube 18 with respect to the disc 21. After centering the glass, the outer portion 29 is normally retracted to avoid interference with the electromagnetic heating field required to effect the glass-to-metal seal. This field is generated in a spiral-wound coil 31 by means of a suitable high-frequency power source 32. At the same time a suitable forming gas consisting of approximately 8% hydrogen and 92% inert gas, such as dried nitrogen, or, preferably, helium, is forced through the channel 28 against the under surface of the disc 21 at a rate of approximately 160 cc. per minute. The reason helium is preferred is that it also serves as a detector gas for detecting leaks in the capsule by means of a mass spectrometer. Some of the gas flows through the central aperture of the disc and on up through the tube 18 and out at the top as indicated by the arrows. The remainder of the gas flows across the lower surface of the disc 21 through channels provided in the upper surface of the central portion 27 of the jig and out through notches 30 in the outer portion 29.

The upper end of the central portion 27 of the jig is so located with respect to the field produced by the coil 31 that the heating effect of the coil is concentrated in the disc 21. I have found that the best location is with the disc 21 close to the plane of the coil 31. A conductive shielding member 33 placed close to the coil is connected to the coil at only one point and is provided with a radial slit so as not to short-circuit the electromagnetic field.

The power source 32 is energized to supply sufficient power to the coil 31 to heat the disc 21 to a temperature of approximately 1000° C. which is slightly above the 980° C. melting temperature of the coin silver ring. This takes approximately two to three seconds. A slight pressure is applied to the upper end of the glass tube 18 by means of a member 34, which may be a weight or may be the end of a lever. The exact sealing time can be observed visually by watching to see when the silver melts. The slight depression at the center of the disc 21 assists in making a better seal at this point by lengthening the portion of the disc in contact with the silver.

When the power is turned off in the circuit 32, the entire structure comprising the disc 21 and the contiguous end of the glass tube 18 cools down rather quickly. This has the advantage that no excess heat is generated which would change the properties of the electrical component being encapsulated.

As is well known a thin oxide layer must be provided on the periphery of the disc 21 in order to provide a proper seal to the molten glass at the end of the tube 18. While in some glass-to-metal seals using Kovar, the Kovar can be pre-oxidized, it is not desirable to do so in the present seal because of the fact that the silver braze material of the ring 24 will not adhere to the disc 21 if the latter has an oxide coating on it. Therefore the oxide must be provided during the sealing process itself while at the same time the area around the central aperture must be kept free of oxygen. This is the reason for having a flow of non-oxidizing forming gas across the surface of the disc 21. This flow precludes the oxygen in the air from reaching the central portion of the disc around the aperture and thus keeps this central portion clean so as to permit the silver to adhere to it without the necessity of providing any flux. However the flow of forming gas is not so great as to preclude the surrounding air from reaching the periphery of the disc 21 and oxidizing this periphery. The oxidation is made more rapid because of the fact that the disc is heated up.

In order to make the second seal at the other end of the glass tube 18, the partially completed seal is inverted and the other lead 16 is threaded through a silver ring similar to the ring 24 and through the central aperture of the Kovar disc 19 which rests on the upper surface of the central portion 27 of the jig. The same heating program is carried out as for the first part of the seal and during this heating the same forming gas is forced up through the channel 28. This forming gas substantially fills the open space within the capsule and provides a suitable, inert atmosphere for the encapsulated resistor, which is very desirable. When the seal is complete, there is no outlet for the gas trapped within the capsule but, at this instant the gas is still expanding slightly due to continued heating and as a result it tries to escape along the space between the disc 19 and the lead wire 16. However this space is filled with molten silver brazing material and so the gas can only push a small amount of that brazing material out a short distance creating a lump as indicated by reference character 36 in FIG. 1. This does not permit the gas to escape from any point in the capsule. This makes the lump 36 a simple visual indication of the quality of all of the seals in the capsule.

While this invention has been described in terms of specific embodiments and specific steps, it will be recognized by those schooled in the art that modifications may be made therein which will still be within the scope of the following claims.

What is claimed is:

1. The method of encapsulating an electrical component having a body and a pair of conductive terminals extending therefrom, said method comprising the steps of: threading one of said terminals through a first metal member and through a member of brazing material; seating said metal member in a jig adjacent to a coil; placing a glass tube around said component, said glass having a coefficient of thermal expansion substantially matching that of said metal member and having an opening, said metal member substantially fitting said opening; blowing forming gas across the portion of said metal member around said one terminal; energizing said coil with electromagnetic energy to heat said metal member to a temperature at which said glass flows and at which said brazing material melts, said metal being in a high intensity region of the electromagnetic field of said coil and having a layer of oxide on the periphery thereof; maintaining the energy in said coil at said last-named level until an entire ring of contact between said layer of oxide on said metal member and the molten glass has been established; and thereafter reducing said energy to zero and permitting said metal member and said glass to cool down.

2. The method of encapsulating an electrical component having a body and a pair of conductive terminals extending therefrom, said method comprising the steps of: threading one of said terminals through a first metal member and through a member of brazing material; setting said metal member in a jig adjacent to a coil; placing a glass tube around said component, said glass having a coefficient substantially matching that of said metal member and having an opening at one end thereof, the periphery of said metal member contacting the glass adjacent to said opening; blowing forming gas between said metal member and said one terminal while permitting air to flow into contact with the portion of said metal member in contact with said glass to create an oxide layer on the periphery of said metal member; energizing said coil with electromagnetic energy to heat said metal member and the adjacent glass to a temperature at which said glass flows and at which said brazing material melts, said metal member being in a high intensity region of the electromagnetic field of said coil; maintaining the energy in said coil at the said last-named level until an entire ring of contact between said metal member and the molten glass has been established; and thereafter reducing said energy to zero and permitting said metal member and said glass to cool down.

3. The method of encapsulating an electrical component having a body and a pair of conductive terminals extending therefrom, said method comprising the steps of: threading one of said terminals through a first circular metal member and through a member of brazing material; seating said metal member in a jig adjacent to a coil; placing a round glass tube, which is open at both ends, around said component, said glass having a coefficient of thermal expansion substantially matching that of said metal member, the periphery of said metal member substantially fitting one end of said tube; blowing forming gas across the portion of said metal member around said one terminal while permitting oxygen to reach the periphery of said metal member to oxidize said periphery; energizing said coil with electromagnetic energy to heat said metal member to a temperature at which said glass flows and at which said brazing material melts, said metal being in a high intensity region of the electromagnetic field of said coil; pressing said periphery into said molten glass to facilitate bonding said glass to said metal member; maintaining the energy in said coil at said last-named level until an entire ring of contact between said metal member and the molten glass has been established; and thereafter reducing said energy to zero and permitting said metal member and said glass to cool down.

4. The method of encapsulating an electrical component having a body and a pair of conductive terminals extending therefrom, said method comprising the steps of: threading one of said terminals through a first round, Kovar, metal disc and through a ring of coin silver brazing material; seating said metal member in a jig adjacent to a coil; placing a round borosilicate glass tube open at both ends around said component, said glass having a coefficient of thermal expansion substantially matching that of said disc, the periphery of said disc substantially matching in size and shape one open end of said tube; blowing forming gas across the portion of said disc around said one terminal and permitting air to flow into contact with the periphery of said disc to create an oxide layer on said periphery; energizing said coil with electromagnetic energy to heat said disc to a temperature at which said glass flows and at which said brazing material melts, said disc being in a high intensity region of the electromagnetic field of said coil; maintaining the energy in said coil at said last-named level until an entire ring of contact between the periphery of said disc and the molten glass has been established; and thereafter reducing said energy to zero and permitting said glass and said brazing material to solidify.

References Cited by the Examiner

UNITED STATES PATENTS

| | | | |
|---|---|---|---|
| 2,215,587 | 9/1940 | Kerschbaum | 338—237 |
| 2,699,594 | 1/1955 | Bowne | 65—58 X |
| 3,023,389 | 2/1962 | Hughes et al. | 338—237 |
| 3,037,266 | 6/1962 | Pfister | 29—155.63 |
| 3,048,914 | 8/1962 | Kohring | 29—155.63 |

CHARLIE T. MOON, *Primary Examiner.*

RICHARD M. WOOD, WHITMORE A. WILTZ, *Examiners.*

V. Y. MAYEWSKY, W. I. BROOKS, *Assistant Examiners.*